April 8, 1958

J. F. BARGER 2,830,148

REMOTELY CONTROLLED SWITCH FOR REVERSING
DIRECT CURRENT MOTORS

Filed June 1, 1954

United States Patent Office 2,830,148
Patented Apr. 8, 1958

2,830,148

REMOTELY CONTROLLED SWITCH FOR REVERSING DIRECT CURRENT MOTORS

John F. Barger, Portland, Oreg.

Application June 1, 1954, Serial No. 433,479

1 Claim. (Cl. 200—87)

This invention relates to a control device adapted particularly but not exclusively for application to a toy electric locomotive for reversing by remote control the direction of rotation of a commutator type driving motor for the locomotive.

One of the principal objects of the invention is to provide a magnetically operated switch employing a pivotally mounted magnet disposed within and influenced by the magnetic flux of the field magnet or winding of the motor for reversing the polarity of the motor and hence its direction of rotation and the direction of travel of the locomotive or train.

Another object is to render said device instantly operable at full voltage of the same current utilized to drive the motor regardless of whether the train is stopped or running, in contrast to known devices in which the motor changes its direction of rotation only at each new start.

Another feature of the invention is its simple, efficient, durable and inexpensive construction and its convenient adaptability to any type of motor driven toy locomotive or the like.

The foregonig and other objects will appear as my invention is more fully hereinafter described in the following specification, illustrated in the accompanying drawing, and finally pointed out in the appended claim.

Figure 1:
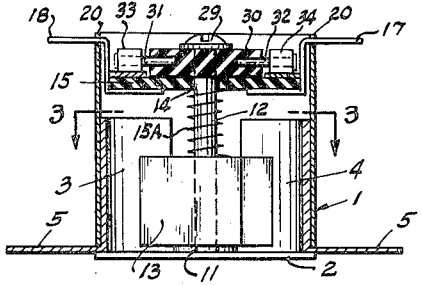
Figure 1 is a sectional view taken approximately along the line 1—1 of Figure 2 which is a top plan view of a magnetically operated switch made in accordance with my invention.
Figure 4:
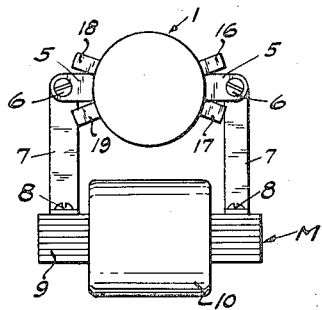
Figure 4 is a top plan view of the frame and field coil or winding of an electric motor showing said switch on a reduced scale operatively attached thereto and disposed within the magnetic field of said field coil or winding.

The switch comprises a cylindrical housing indicated generally by reference numeral 1 made of dielectric material and closed at its bottom end by a base plate 2 of the same material. Secured to the interior of the housing are two iron cylindrical segments 3 and 4 formed with laterally extending feet 5 for attaching the switch in its entirety as at 6 to a pair of iron supporting arms 7 secured as at 8 to the field pole pieces 9 of an electric motor M to position the switch within the magnetic field of the field coil 10 of the motor, the latter being the type generally used for driving toy railroad locomotives.

Figure 3:
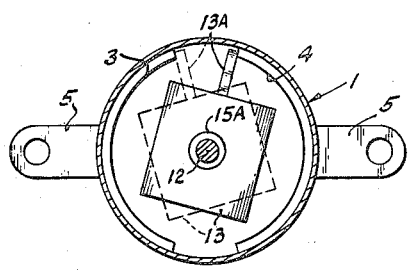
Figure 3 is a sectional top plan view taken along the line 3—3 of Figure 1.

Pivotally mounted as at 11 in the base plate 2 of the housing 1 is a vertical shaft 12 to whose lower portion is secured for pivotal movement therewith a permanent magnet 13 of cubiform as shown. The magnet is provided with an arm 13A adapted to alternately contact the adjacent ends of the segments 3 and 4 which serve as limit stops for movement of the magnet from the full line to dotted line position shown in Figure 3. The upper end of the shaft 12 extends through an opening 14 in a fixed disc 15 of dielectric material. A coil spring 15A surrounds the shaft 12 and bears against the underside of the disc 15 and the top of the magnet 13. Said disc is supported in a fixed position by means of arms 16, 17, 18 and 19 secured to the top and bottom of the disc as shown and extending upwardly and outwardly therefrom within shouldered recesses 20 formed in the top rim of the housing 1.

The inner ends of the arms 16—19 terminate in contact segments 21—22, respectively, secured in any approved manner to the top surface of the fixed disc 15. The other arms 17—18 terminate in segmental portions 23—24, respectively, secured to the underside of the disc 15 and having portions extending upwardly therethrough to provide contacts 25—26 and 27—28, respectively.

Figure 2:
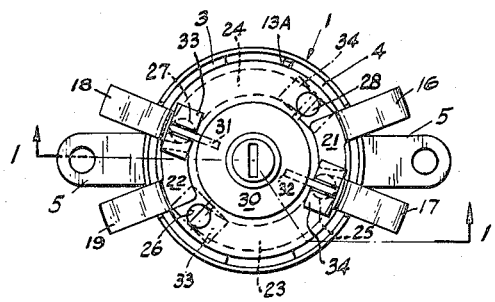
Figure 5:
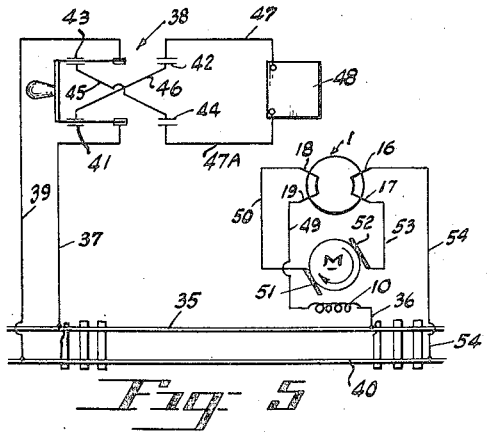
Figures 5 and 6 are schematic wiring diagrams showing the magnetically actuated switch in two different positions and a manually actuated switch for selectively changing the polarity of electrical current to the tracks of a toy railroad system and to the electric motor.

Secured as at 29 to the top end of the shaft 12 for pivotal movement therewith is a disc 30 of dielectric material provided with diametrically opposed radially extending pins 31—32 each provided with contact shoes 33—34, respectively, adapted to be swung by the magnetically actuated shaft 12 and disc 30 into the various circuit closing positions shown in full and broken lines in Figure 2. The spring 15A applies sufficient tension to the disc 30 to insure proper electrical contact of the contact shoes with the various contacts 28—21—25 and 27—22—26. The operation of the magnetically actuated switch can be better explained in the detailed description of Figures 5 and 6 as follows:

In Figure 5, one side 35 of a toy track section is electrically connected by a conductor 36 to one side of the field coil 10 of the motor M and by conductor 37 to one side of a manually actuated double pole double throw switch 38 whose opposite side is connected by conductor 39 to the opposite side 40 of the track section. The poles 41—42 and 43—44 of switch 38 are interconnected respectively by cross wires 45 and 46. Poles 42—44 are connected by conductors 47—47A to a direct current transformer or any other suitable source of direct current generally indicated at 48. The opposite side of the motor field coil 10 is connected by conductor 49 to the contact arm 19 of the magnetic switch and the contact arm 18 is connected by conductor 50 to one of the brushes 51 of the motor M. The opposite brush 52 is connected by conductor 53 to the contact arm 17 and the contact arm 16 is connected by conductor 54 to the side 40 of the toy track section.

With the parts of the magnetic switch in the position shown in full lines in Figure 2 which corresponds with that shown in Figure 5 and with the manual switch in the position also shown in Figure 5, the motor M will be energized to rotate in the direction of the arrow applied to it by a circuit which can be traced from the negative side of the transformer or other source 48 through conductor 47, manual switch pole 42, cross wire 46, pole 41 and its respective switch blade, conductor 37, side 35 of the toy track section, conductor 36, motor field coil 10, conductor 49, connecting arm 19, through contacts 22—27 of the magnetic switch through the medium of the movable contact shoe 33, then through connecting arm 18, through conductor 50 to the brush 51 of the motor, through the motor to the opposite brush 52, through conductor 53, connecting arm 17 through contacts 25—21 of the magnetic switch by means of movable contact shoe 34 thence through connecting arm 16, through conductor 54 through the opposite side 40 of the track section, through conductor 39, pole 43 of the manual switch 38 by means of its respective switch blade, through cross wire 45, pole 44 and conductor 47A back to the opposite or positive side of the transformer 48 or other source of direct current as aforesaid.

Figure 6:
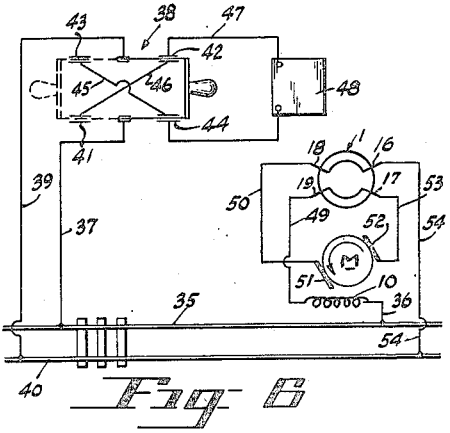

To reverse the direction of rotation of the motor and consequently the direction of travel of the locomotive at any point in the entire track it is merely necessary to throw the manual switch from the position shown in Figure 5 to that shown in Figure 6, whereupon the now reversed polarity of the current from source 48 will reverse the magnetic flux of the field coil 10 which will instantaneously pivot the magnet 13 and its related parts to transpose the movable contact shoes 33—34 from their full line position in Figure 2 to their broken line position therein. In this latter position the polarity of the field coil 10 will be reversed with a resultant reverse rotation of the motor while the polarity at the motor brushes 51—52 will remain the same as in Figure 5.

The arm 13A of the magnet 13 limits pivotal movement of the magnet and its related parts to properly position the contact shoes in their various circuit switching positions shown in Figure 2 and described in connection with Figures 5 and 6.

While I have shown a particular form of embodiment of my invention I am aware that many minor changes therein will readily suggest themselves to others skilled in the art without departing from the spirit and scope of the invention. Having thus described my invention what I claim as new and desired to protect by Letters Patent is:

A magnetic switch of the class described, comprising a cylindrical housing made of dielectric material and closed at its bottom end by a base plate, two spaced apart iron cylindrical segments disposed within the housing and having their bottom ends laterally projecting outwardly from the bottom end of the housing and thereby connected to a pair of spaced apart parallel iron arms adapted at their opposite ends for attachment to the field pole pieces of a motor thereby magnetically linking said iron cylindrical segments to the field of the motor, a vertical shaft pivotally supported at its bottom end in said base plate and extending upwardly through an opening in a disc of dielectric material fixedly secured within the top end of said housing, a cubiform permanent magnet secured to said shaft for pivotal movement therewith and disposed entirely within the confines of said cylindrical segments and thereby pivotally responsive to the polarity changes in the motor field and said segments, an arm secured to and extending outwardly from said magnet and adapted to alternately contact adjacent ends of said cylindrical segments to limit pivotal movement of the magnet and said vertical shaft, two pairs of stationary contacts secured to the top surface of said disc, a second disc of dielectric material superimposed upon the first mentioned disc and secured to said shaft for pivotal movement therewith, a pair of diametrically opposed contacts carried by said second disc and so arranged as to interconnect both contacts of each one pair of said stationary contacts in one direction of polarity in said motor field and cylindrical segments and by rotation to interconnect the contacts of one pair with the contacts of the other in an opposite direction of polarity of the motor field and cylindrical segments.

References Cited in the file of this patent

UNITED STATES PATENTS

| | | |
|---|---|---|
| 948,374 | Hayes | Feb. 8, 1910 |
| 1,259,135 | Roe | Mar. 12, 1918 |
| 1,586,221 | Schwarzenhauer | May 25, 1926 |
| 1,945,454 | Trubert | Jan. 30, 1934 |
| 2,437,726 | Davis | Mar. 16, 1948 |
| 2,581,166 | Bonanno et al. | Jan. 1, 1952 |